United States Patent
Chandarana et al.

(10) Patent No.: US 11,354,936 B1
(45) Date of Patent: Jun. 7, 2022

(54) INCREMENTAL CLUSTERING FOR FACE RECOGNITION SYSTEMS

(71) Applicant: Amazon Technologies, Inc., Seattle, WA (US)

(72) Inventors: Dharmil Satishbhai Chandarana, Bellevue, WA (US); Ilya Levner, Woodinville, WA (US); Zhaoqing Ma, Sammamish, WA (US); Prajwal Yadapadithaya, Seattle, WA (US); Riley James Williams, Seattle, WA (US); Canku Alp Calargun, Redmond, WA (US); Prama Anand, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/929,387

(22) Filed: Jul. 15, 2020

(51) Int. Cl.
*G06V 40/00* (2022.01)
*G06V 40/16* (2022.01)
*G06K 9/62* (2022.01)

(52) U.S. Cl.
CPC ......... *G06V 40/172* (2022.01); *G06K 9/6269* (2013.01); *G06V 40/165* (2022.01); *G06V 40/171* (2022.01)

(58) Field of Classification Search
CPC .......... G06K 9/00288; G06K 9/00248; G06K 9/00281; G06K 9/6269
See application file for complete search history.

(56) References Cited

U.S. PATENT DOCUMENTS

| | | | | |
|---|---|---|---|---|
| 8,005,767 B1* | 8/2011 | Cassella | ............... | G06K 9/6262 706/12 |
| 10,169,686 B2* | 1/2019 | Bourdev | ................ | G06Q 50/01 |
| 10,929,762 B1* | 2/2021 | Chen | ...................... | G06N 20/10 |
| 2007/0286497 A1* | 12/2007 | Podilchuk | ............ | G06K 9/6206 382/218 |
| 2009/0180671 A1* | 7/2009 | Lee | ....................... | G06K 9/6234 382/118 |
| 2014/0270495 A1* | 9/2014 | Tu | .............................. | G06T 7/11 382/160 |
| 2017/0061257 A1* | 3/2017 | Yang | ..................... | G06K 9/6282 |
| 2020/0349374 A1* | 11/2020 | Morzhakov | .......... | G06V 40/172 |

OTHER PUBLICATIONS

Schroff, F., Kalenichenko, D., and Philbin, J. Facenet: A unified embedding for face recognition and clustering. In Proceedings of the IEEE conference on computer vision and pattern recognition, pp. 815-823, 2015.
Rudd, E. M., Jain, L. P., Scheirer,W. J., and Boult, T. E. The extreme value machine. CoRR, abs/1506.06112, 2015. URL <http://arxiv.org/abs/1506.06112>.

* cited by examiner

*Primary Examiner* — Md K Talukder
(74) *Attorney, Agent, or Firm* — Patterson + Sheridan, LLP

(57) ABSTRACT

Techniques for improved image classification are provided. Face embeddings are generated for each face depicted in a collection of images, and the face embeddings are clustered based on the individual whose face is depicted. Based on these clusters, each embedding is assigned a label reflecting the cluster assignments. Some or all of the face embeddings are then used to train a classifier model to generate cluster labels for new input images. This classifier model can then be used to process new images in an efficient manner, and classify them into appropriate clusters.

20 Claims, 7 Drawing Sheets

INCREMENTAL CLUSTERING FOR FACE RECOGNITION SYSTEMS

BACKGROUND

The present disclosure relates to facial recognition, and more specifically, to utilizing classifier models to reduce clustering requirements in facial recognition.

Recently, many face recognition systems have begun utilizing clustering algorithms to organize large collections of faces into different clusters, each corresponding to a unique individual. Typical clustering techniques require $O(n^3)$ time to execute, and can occupy $O(n^2)$ or more space in memory, where n is the size of collection. This can impose significant burdens on the system, as well as non-trivial delays before results are available. Additionally, existing approaches require a full re-cluster whenever new data (e.g., a new image) is added to the collection, as all assignments from the previous run are overwritten.

When existing clustering systems are deployed to production environments that serve a large amount of live traffic, unique challenges are presented relating to the efficiency of the clustering system. The significant computational and time expense, as well as the fact that clustering results are overwritten whenever new data is received, makes these approaches inefficient and not practical at realistic scales. That is, because frequent additions to a large collection of images are very common in these deployments, the computational cost and wait time for the updated results becomes problematic.

DETAILED DESCRIPTION

Figure 1:
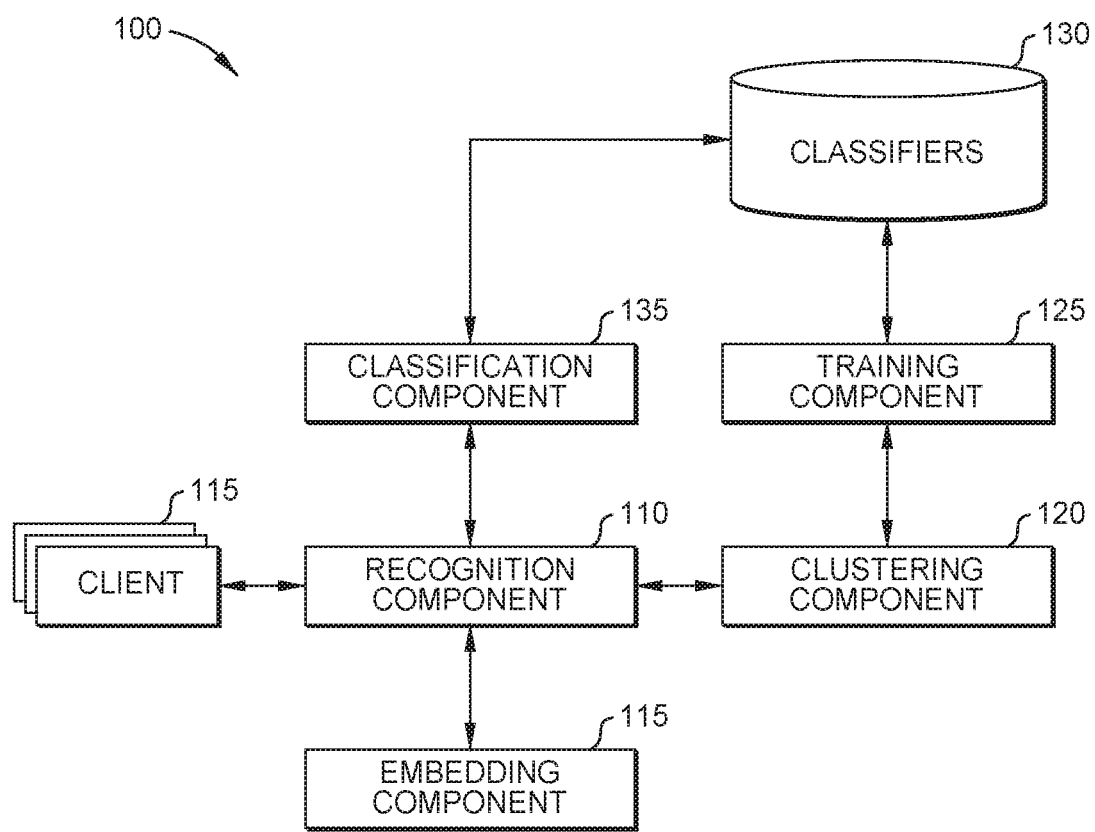
FIG. 1 depicts a system for supplementing clustering techniques with classification models to perform incremental facial recognition, according to some embodiments disclosed herein.

Embodiments of the present disclosure provide techniques to combine clustering algorithms and classifier models into hybrid systems capable of performing incremental clustering and classification in order to improve facial recognition processes with reduced latency and computational costs. In some embodiments, a classification-based incremental clustering approach is used, which is capable of assigning cluster labels for new data points (new images/faces) in linear time (as opposed to cubic time for existing clustering approaches). In some embodiments, the need for re-clustering of the data is additionally reduced, even when the collection undergoes frequent updates and additions. In some embodiments, the system uses full clustering to generate training labels, then uses this labeled data to train a classifier. This classifier can then be used for incremental new data points, reducing the need to re-cluster the data. As such, faces depicted in new images can be labeled in near real-time, resulting in significant reductions in computing and memory resources needed.

In one embodiment, during runtime (e.g., as new images are uploaded or provided for face detection and classification), the image is first passed through a face detection model which emits the locations of any faces (if present) in the image. For example, the face detection model may return the coordinates of a bounding box around each detected face. In an embodiment, each face is then processed to generate an embedding vector. To do so, a face recognition deep learning model may be utilized. Initially (prior to runtime), this deep learning model (e.g., a deep neural network) is trained to classify faces into different classes corresponding to unique individuals within a predefined training dataset. Subsequently, at runtime (when processing new faces), the output of the penultimate layer of this model, which may be a high dimensional embedding vector, is used as a face embedding. As used herein, a face embedding is a vector (also referred to as an embedding vector, a face vector, or an embedding) that describes the features of a face image. Each face embedding generally specifies a value for each of a number of dimensions, where the values for a given face embedding are determined based on a corresponding image of a face that was used to generate the vector. In at least one embodiment, prior to generating the face embedding, the system obtains a face crop by cropping the bounding box from image, and resizes the face crop to a predefined dimension (e.g. 256×256). This resized image is then used as input to generate the embedding vector.

In an embodiment, if no classifier is available for the collection, the embeddings for each face image are then used as input for a clustering algorithm. In one embodiment, the system utilizes agglomerative clustering based on average pair-wise distances between face embeddings. In some embodiments, however, any suitable clustering technique can be used. Typically, such clustering algorithms require significant time and computational resources, on the order of $O(n^3)$. Once the clusters have been generated, in an embodiment, each respective face embedding is associated with a cluster label that identifies the unique individual depicted in the respective face image that was used to generate the respective face embedding. Using these labeled face embeddings, the system can train a classifier model. For example, the system can utilize a given face embedding as input, and use the corresponding cluster label (e.g., the identifier of the unique individual depicted in the corresponding face image) as target output for the model. Using backpropagation, the system can iteratively train a classifier to assign labels to input face embeddings. In at least one embodiment, an Extreme Value Machine (EVM) classification algorithm is utilized for the classifier model. In various embodiments, however, any suitable multi-class classification technique can be readily applied.

In some embodiments, a classifier is trained for each collection of images. That is, each collection of images/faces is associated with a respective classifier trained exclusively on those images/faces. For example, in one embodiment, each client or user may upload images to their own collection, and a classifier model is trained for their collection. When an image is received subsequently for a given collection, the system can process it using the trained model for the collection in order to generate a label. As the classifier can execute much more rapidly and with lower computational resources than a full re-clustering, the system thereby reduces latency and resource usage. In some embodiments, the system can perform full re-clustering of a given collection when certain criteria or metrics are satisfied. As used herein, a collection generally refers to a set of images within a common group (e.g., an album). In an embodiment, each user or client may have one or more corresponding collections associated with them.

In various embodiments, the criteria may include a predefined period (e.g., every four hours), predefined times or dates (e.g., clustering should be performed during non-business hours), the occurrence of predefined events (e.g., if the classifier cannot label an input image with sufficient confidence), and the like. Further, in at least one embodiment, the system can utilize a combination of these criteria. For example, the system may check (periodically or on a scheduled basis) whether any new faces were not classified with sufficient confidence. If so, a re-clustering is performed. In embodiments, once the re-clustering is completed, a new classifier is trained based on the updated labels generated by the clustering algorithm. This new classifier is then used for subsequent images.

FIG. 1 depicts a system 100 for supplementing clustering techniques with classification models to perform incremental facial recognition, according to some embodiments disclosed herein. In the illustrated embodiment, a Recognition Component 110 generally facilitates face recognition services, in conjunction with an Embedding Component 115, Clustering Component 120, a Training Component 125, a Classification Component 135, and a set of Classifiers 130. Although depicted as discrete components for conceptual clarity, in embodiments, the operations and functionality of each may be combined or distributed across any number of components and devices. Similarly, in some embodiments, there may be additional components and devices included in the workflow but not pictured in the illustrated embodiment.

As illustrated, the Recognition Component 110 is communicatively coupled with one or more Clients 105. Although the illustrated embodiment depicts a direct communication link (e.g., with no intervening devices or components) for conceptual clarity, in embodiments, there may be any number of intervening components in the communications link. For example, in one embodiment, the Client 105 may provide data (such as images) to a service (e.g., an image storage service), which may in turn provide some or all of these images to the Recognition Component 110.

In some embodiments, users must opt-in to use the face recognition service(s). Without such opt-in, the Recognition Component 110 does not receive any data from the Client(s) 105. Similarly, in some embodiments, Clients 105 can opt out of the service. In one such embodiment, once a given Client 105 opts out, the system removes/deletes all data associated with the Client 105. This may include, without limitation, all images and image data stored for the Client 105, any Classifiers 130 trained for the client, and the like. Notably, in an embodiment, opting out removes data from the recognition system, but does not affect the client's images stored in their collection. That is, the client may continue to use the storage service for their collections, without any data being received by the recognition system 100.

In one embodiment, whenever new image(s) are available (e.g., whenever a Client 105 uploads an image to their collection), the Recognition Component 110 initiates a face recognition workflow. In other embodiments, new images are instead processed periodically (e.g., every hour). In still another embodiment, new images are processed only upon specific request (e.g., when the Client 105 requests that one or more particular images be analyzed). In embodiments, the facial recognition workflow for any given Client 105 generally includes analyzing one or more images in the corresponding image collection for the Client 105 to identify and categorize the people in each image. Generally, the system can cluster or group faces belonging to the same person into categories or labels, where each label represents a unique person, in order to allow the user to quickly find images of any particular person in their collection.

In the illustrated embodiment, upon receiving an image, the Recognition Component 110 uses the Embedding Component 115 to generate face embeddings for any faces included in the image. In at least one embodiment the Recognition Component 110 (or another component) can first process the image(s) using one or more techniques or algorithms to identify faces in the image. Additionally, these identified faces may undergo other processing prior to evaluation by the Embedding Component 115, such as cropping to the face, converting the face to a standard size and/or format, and the like. In embodiments, the Embedding Component 115 is generally configured to process face images and return an embedding vector describing features of the face.

In some embodiments, the Embedding Component 115 utilizes a trained neural network that classifies faces into different classes corresponding to unique individuals within a predefined training dataset. Notably, this training dataset may be entirely distinct from any collection associated with the Client(s) 105. This is because the ability to accurately identify people in the training set is irrelevant to the operations of the Embedding Component 115. Instead, the final layer of the network is stripped off and the output from the penultimate layer, which is a vector describing the input face image, is returned as a face embedding vector.

In one embodiment, the Recognition Component 110 determines whether a trained Classifier 130 is available for the image. That is, the Recognition Component 110 can determine whether the collection to which the image belongs has a trained Classifier 130 associated with it. If so, the Recognition Component 110 provides the face embedding vector(s) (generated by the Embedding Component 115 for each face depicted in the image) to the Classification Component 135. In another embodiment, rather than determine whether a Classifier 130 is available, the Recognition Component 110 can instead transmit the face embedding and/or an identification of the corresponding collection to the Classification Component 135. The Classification Component 135 can then determine whether a Classifier 130 has been trained. Additionally, in at least one embodiment, the Recognition Component 110 and/or Classification Component 135 can check whether the collection is currently undergoing a full clustering. If so, the system refrains from further processing of the image. In some embodiments, the image is subsequently processed once the clustering completes. In at least one embodiment, the image can be added to the clustering process, depending on the stage of the clustering.

In the illustrated embodiment, the Classification Component 135 retrieves the corresponding Classifier 130 for the collection that is associated with the image/collection. The Classification Component 135 can then provide the face embedding vector(s) generated for the new image as input to the trained Classifier 130, which returns a label for each face (e.g., an assignment to a cluster or group in the collection). In some embodiments, the Classifier 130 additionally returns a confidence score, indicating a probability that the label is correct. In one embodiment, if the confidence is below a predefined threshold, the Classification Component 135 determines that the Classifier 130 cannot classify the face, and indicates, to the Recognition Component 110, that the face is not recognized. In some embodiments, the Classifier 130 can also utilize a "null label," in addition to labels associated with individuals. That is, while most labels indicate a particular unique person, the null label can indicate that the face does not belong to any of the other labels.

If the confidence score of the generated label is sufficiently high, the Classification Component 135 can return the indicated label to the Recognition Component 110. Upon receiving a label/response from the Classification Component 135, in some embodiments, the Recognition Component 110 can update the collection and/or other data stores to indicate the identity of the person or people in the newly-received image. In this way, users can quickly sort or filter their collections based on the labels (e.g., selecting a specific label), in order to retrieve images featuring the specific person that corresponds to the label. In some embodiments, if the Classification Component 135 indicates that the face could not be classified with sufficient confidence (or if the face was assigned the null label), the Recognition Component 110 can store an indication (e.g., in the collection and/or as metadata associated with the image, face data, and/or embedding data) that the face was not recognized. This can be used, possibly in conjunction with other criteria, to trigger a full re-cluster of the collection.

In at least one embodiment, a re-cluster is triggered when a face is not recognized by the Classification Component 135. In some embodiments, the Recognition Component 110 waits for other criteria (such as a threshold number of unidentified faces, a periodic condition, a time delay criteria, criteria related to network or computational load, and the like) to trigger a clustering. Upon determining that a given collection should be re-clustered, the Recognition Component 110 initiates the clustering process and provides an indication of the collection to the Clustering Component 120.

In some embodiments, the Clustering Component 120 utilizes an agglomerative clustering technique to generate a set of clusters for the collection, each respective cluster including face images for a respective unique individual depicted in one or more images in the collection. In embodiments, the Clustering Component 120 operates on the face embeddings generated for each face depicted in the collection, and iteratively computes pair-wise similarities between these embeddings in order to create the cluster labels. In at least one embodiment, the Clustering Component 120 can additionally create a "null cluster," which acts as a placeholder for faces that were not assigned to any particular cluster. That is, for a given face embedding, if the Clustering Component 120 cannot identify at least one other face that belongs in the same cluster, the Clustering Component 120 can assign the given face embedding to the null cluster.

In one embodiment, once the Clustering Component 120 has generated the clusters, the faces are each labeled with the corresponding cluster label. As above, these labels may be stored with the collection, included as metadata with the images, and the like. In this way, users can easily sort and filter the images based on the labels, which indicate the identity of each person in each image. In the illustrated embodiment, these labeled face embeddings are provided to the Training Component 125. The Training Component 125 can then use the labeled face embeddings as training data to train a classifier model for the collection. For example, the Training Component 125 may use each face embedding as input, with the corresponding label utilized as target output. The model parameters (e.g., weights) can then be refined (such as through back propagation) in order to iteratively refine the model for the collection.

In some embodiments, the Training Component 125 utilizes an EVM model as the classifier. In various embodiments, however, any number of models may be utilized, such as support vector machines (SVM). Generally, the EVM model learns extreme vectors for each class, as well as the probabilistic representation of each class's decision boundary. In embodiments, the EVM classifier is used to respond well to open-set scenarios, as faces of new people (e.g., unknown classes) are likely to be added to each collection over time. Thus, it may be desirable to utilize a classifier model that accurately rejects unknown faces.

In one embodiment, the Training Component 125 trains the classifier based on the clusters generated by the Clustering Component 120. That is, the Training Component 125 can train the Training Component 125 to label input images into any cluster label (e.g., any unique individual) represented in the collection. In some embodiments, however, the Training Component 125 may utilize one or more optimizations to limit the number of clusters that are used. In one such embodiment, the Training Component 125 may select only the top k clusters for training the classifier, where k is a predefined value set by a user or administrator. For example, in various embodiments, the Training Component 125 may utilize the top five clusters, the top ten clusters, and so on.

In embodiments, the classifier may be trained more rapidly (and with reduced computational expense) when trained on such a subset of clusters, as compared to all clusters present in the collection. Similarly, in some embodiments, the resulting classifier may provide more accurate results in terms of rejection rates. In some embodiments, the top clusters are identified based on size. That is, the top k clusters refers to the k largest clusters, in terms of the number of faces/examples included in each. Such an embodiment may be advantageous because Clients 105 are likely to care more about new photos being added quickly to the clusters of the top k individuals in their collection, and care relatively less about other faces of people with smaller clusters. That is, the individuals/faces that are most important to a given client are likely to be more prominently/frequently included in the image collection, yielding larger clusters.

In some embodiments, therefore, the Training Component 125 trains the classifier based only on the top k clusters, and refrains from utilizing samples from lower clusters. As used herein, training the classifier on a cluster means training the classifier using the cluster label as target output for at least one exemplar during the training phase. This allows the classifier, once trained, to classify input into the cluster. In contrast, refraining from training the classifier on a cluster means not using the cluster label as target output for any inputs, such that the classifier cannot assign input into the cluster.

In some embodiments, to further improve the operation of the classifier, the Training Component 125 can train the classifier model on the junk/null cluster (e.g., the placeholder used for faces that weren't assigned to any cluster by the clustering algorithm). In some embodiments, the null cluster additionally includes faces that belong clusters which are below a predefined size. For example, in one such embodiment, any clusters with less than ten faces may be merged with the null cluster. That is, the Training Component 125 may use this "null label" as target output when given input images that do not belong to any cluster (or belong to a cluster that is smaller than a predefined size). This can allow the classifier to reject faces more often if they do not belong to any cluster used when training the classifier.

In embodiments, when the classifier computes distances between any two embeddings, a variety of distance metrics may be utilized. These may include, without limitation, a Bray-Curtis similarity (or dissimilarity) measure, a Canberra distance, correlation distance, cosine distance, Euclidean distance, Mahalanobis distance, Minkowski distance, and the like. In experimentation, Bray-Curtis similarity was found to achieve high quality results on image collections.

In some embodiments, although the classifier may return results much more rapidly than clustering techniques, the training of the classifier may require some non-negligible time. In some embodiments, therefore, the Training Component 125 can apply various techniques to accelerate the learning process. In one such embodiment, the Training Component 125 can sub-sample the selected clusters (e.g., the top k clusters, or all clusters) by selecting a maximum threshold number of face examples from each, rather than using all exemplars in the cluster. That is, rather than use all faces in a selected cluster as positive examples, the Training Component 125 may select x faces from the cluster (randomly or pseudo-randomly) to use as positive exemplars. For example, the Training Component 125 may limit the training to one hundred faces from each cluster, four hundred faces from each cluster, and the like. Similarly, the Training Component 125 may select y negative samples per class (e.g., ten negative examples, fifty negative examples, and so on).

As used herein, a face embedding is referred to a positive sample or exemplar with respect to a given cluster if the face embedding is used as input to train the classifier to label input using the label for the given cluster. In contrast, using a face embedding as a negative sample or exemplar for a given cluster refers to using the embedding as input to train the classifier to refrain from assigning the face to the given cluster. That is, suppose two clusters A and B exist, where cluster A includes face embedding a and cluster B includes face embedding b. If face a is used to train the classifier with cluster A as target output, the a face embedding is used as a positive sample for cluster A. If face a is used to train the classifier with respect to cluster B, then the a face embedding is being used as a negative sample for cluster B. By limiting the number of positive and negative samples, the Training Component 125 can more rapidly train the classifier for the collection.

In the illustrated embodiment, once the classifier is fully trained, the Training Component 125 stores it in a storage for Classifiers 130. Notably, as discussed above, the Classifiers 130 can include separate classifier models for any number of users and/or collections. That is, each collection is generally associated with its own respective classifier model, and each Classifier 130 is used only to process images from the corresponding collection. In embodiments, if a Classifier 130 already exists for the collection (e.g., because this is a re-clustering process, rather than the initial clustering), the Training Component 125 can discard or delete it. In this way, the system utilizes and retains only the most recent model for a given collection whenever new images are received.

Figure 2:
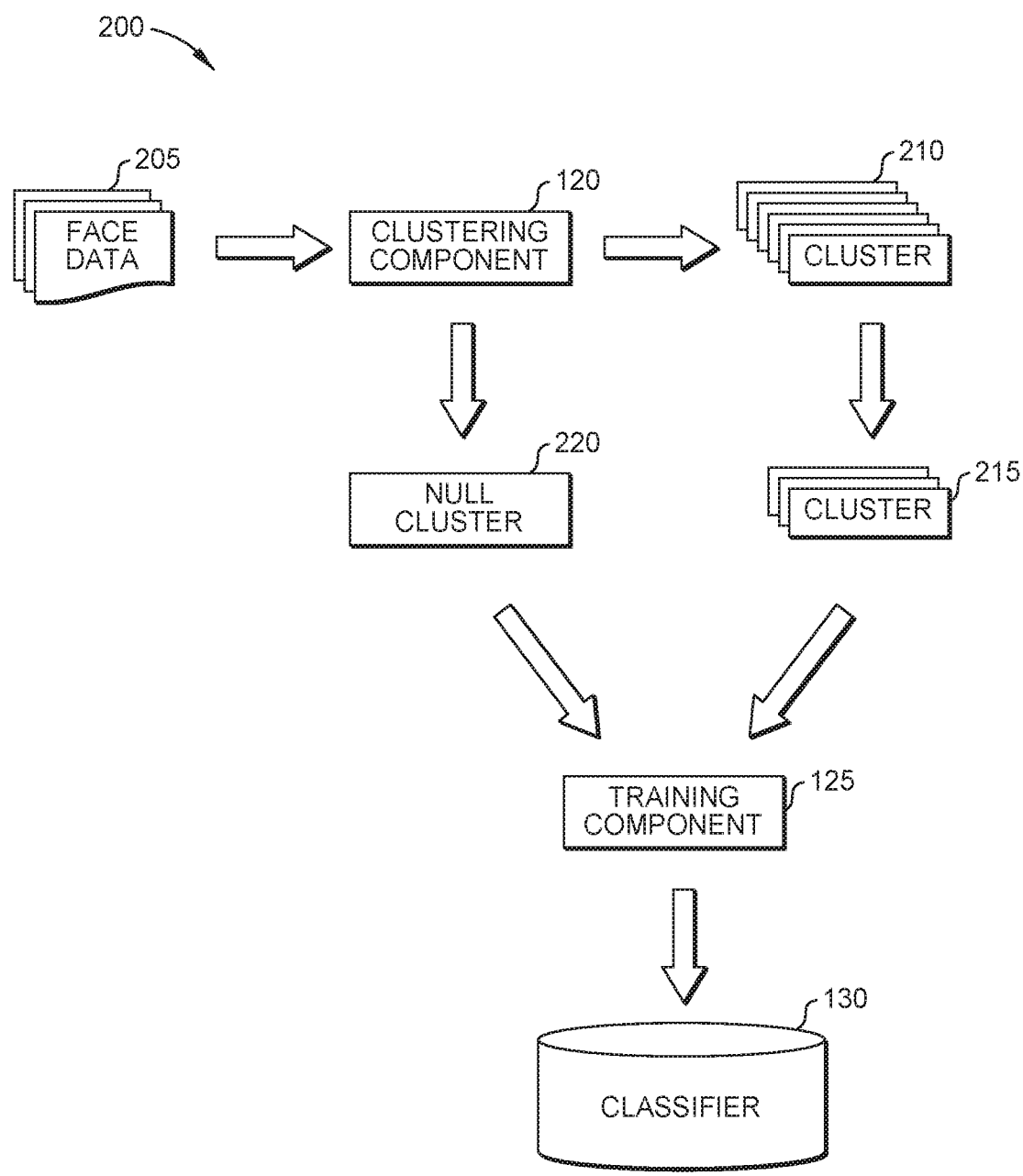
FIG. 2 illustrates a workflow for clustering data and training classification models in order to improve facial recognition, according to some embodiments disclosed herein.

FIG. 2 illustrates a workflow 200 for clustering data and training classification models in order to improve facial recognition, according to some embodiments disclosed herein. In the illustrated embodiment, a collection of Face Data 205 is received by the Clustering Component 120 for clustering. In embodiments, each record or exemplar in the Face Data 205 includes at least a face embedding. In various embodiments, the Face Data 205 can further include an indication of the image the data was collected from, the coordinates of the bounding box around the face in the image, attributes or features of the face, an identifier for the collection and/or user associated with the image, and the like. Additionally, in some embodiments, the face embedding generally includes one or more vectors describing the features of the face (e.g., as a set of values or numbers across a number of dimensions), as well as any relevant flags from the embedding process. In one embodiment, these flags are included by the Embedding Component 115 to indicate that additional pre-processing should be done on the embeddings. For example, in one such embodiment, a flag may indicate that the embedding has a large number of dimensions, which should be reduced or consolidated prior to further processing.

In the illustrated embodiment, the Clustering Component 120 evaluates the Face Data 205 to generate a set of Clusters 210, where each Cluster 210 corresponds to a respective unique individual represented in the Face Data 205. That is, separate records of Face Data 205 that correspond to the same unique person will be assigned to the same Cluster 210, and separate records of Face Data 205 that reflect different individuals will be assigned to differing Clusters 210. In the illustrated embodiment, the Clustering Component 120 also generates a Null Cluster 220 for any elements of the Face Data 205 that are not assigned to a Cluster 210. In embodiments, a given Face Data 205 may be assigned to the Null Cluster 220 because the Face Data 205 did not actually contain a face, because no other examples of the face (or an insufficient number of examples) were present in the data, and the like.

In the illustrated embodiment, this Null Cluster 220 (or a subset thereof) is provided to the Training Component 125. In some embodiments, all generated Clusters 210 are also provided to the Training Component 125. In the illustrated embodiment, however, a subset of the clusters are selected, as indicated by the Selected Clusters 215. In some embodiments, the Selected Clusters 215 are selected by sorting the Clusters 210 based on size (e.g., based on the number of faces/samples in each). This can include selecting the k largest clusters, as well as selecting any clusters with a number of face exceeding a predefined threshold.

As illustrated, the Training Component 125 then uses these provided clusters (the Null Cluster 220 and the Selected Clusters 215) to train the Classifier 130. Notably, in the illustrated embodiment, the Training Component 125 refrains from using the non-selected clusters from the Clusters 210. That is, in the illustrated example, the Classifier 130 is trained without reference to at least one of the Clusters 210. In some embodiments, the Training Component 125 utilizes all examples (e.g., all Face Data 205) assigned to the Null Cluster 220 and Selected Clusters 215. In other embodiments, the Training Component 125 may select a predefined maximum number of examples from each Selected Cluster 215 and the Null Cluster 220, as discussed above. This can accelerate the training process. The Classifier 130 is then stored for subsequent use.

Figure 3:
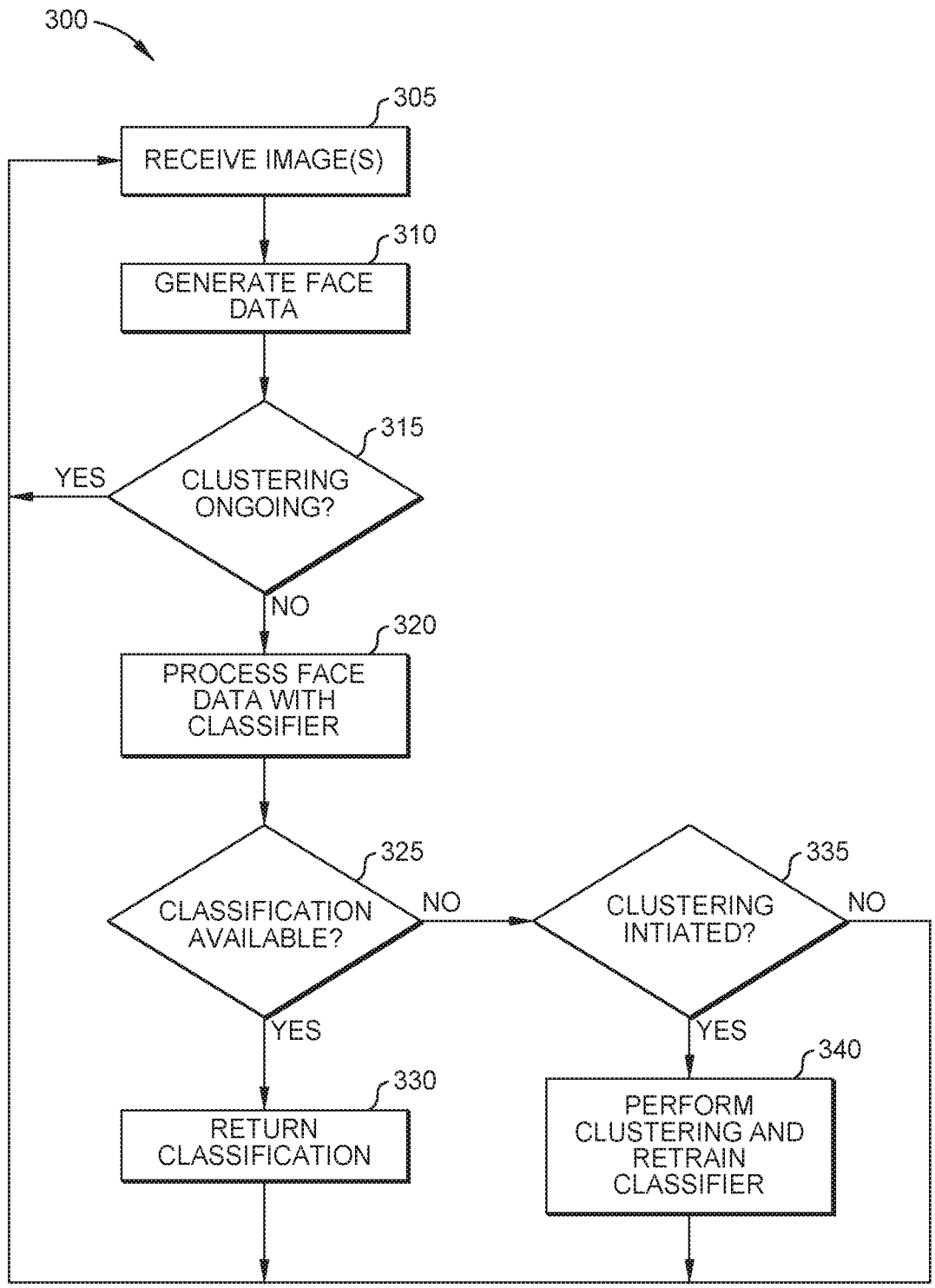
FIG. 3 is a flow diagram illustrating a method of processing images using a hybrid classification and clustering approach in order to perform facial recognition, according to some embodiments disclosed herein.

FIG. 3 is a flow diagram illustrating a method 300 of processing images using a hybrid classification and clustering approach in order to perform facial recognition, according to some embodiments disclosed herein. The method 300 begins at block 305, where a recognition system receives one or more images in a collection. For example, a user may capture one or more images (e.g., using a smart phone or other device) and store them in an album or other storage associated with the user. In some embodiments, the image(s) are then automatically provided to the recognition system (provided the user has opted-in, if applicable). In other embodiments, the user can manually select which image(s) are to be provided to the recognition system. These new images may include zero or more unclassified faces (e.g., depictions of individuals) that are not yet assigned to any cluster or group.

The method 300 then proceeds to block 310, where the recognition system generates face data for the received image(s). In one embodiment, generating the face data begins by processing each image using one or more algorithms or components configured to detect the presence of faces in the image and return a bounding box (e.g., a set of coordinates) defining the location of each face. The recognition system can then process each identified face portion using an embedding component to generate embedding vectors for each face. In some embodiments, the face data can further include a variety of other data, such as an indication of the source image and/or source collection. In some embodiments, the face data is stored with the image(s) in the collection. In at least one embodiment, the face data is additionally or alternatively maintained in a separate repository. The method 300 then continues to block 315.

At block 315, the recognition system determines whether there is an ongoing clustering process for the collection to which the newly-received image(s) belong. If so, the method 300 returns to block 305. That is, in the illustrated embodiment, the recognition system refrains from further processing of the images based on determining that clustering is ongoing, indicating that the classifier will be replaced with a new one relatively soon. The recognition system can then continue to generate and store face data while clustering is ongoing, without classifying or labeling the data. In some embodiments, the recognition system flags this newly-generated face data for further processing, and uses the new classification model to evaluate the new face data once it is completed.

In some embodiments, rather than delay processing, the recognition system proceeds to process the face data using the current classifier. In at least one embodiment, the recognition system can ingest the new face data into the clustering operation that is ongoing. Returning to block 315, if no clustering is currently ongoing for the collection, the method 300 proceeds to block 320. At block 320, the recognition system processes the face data using the trained classifier for the collection. In one embodiment, if multiple faces were detected in the received image(s), the recognition system can iteratively process each using the classifier. In embodiments, the classifier is a trained model configured to assign labels to input face embeddings, where the label indicates the unique individual depicted by the face data.

In some embodiments, the classifier can also assign a null label to input if the face embedding does not belong to any of the clusters on which the model was trained. Additionally, in some embodiments, the classifier also generates a confidence score for the generated label. At block 325, the recognition system determines whether a classification was made for the input face data. In an embodiment, this includes determining whether the generated label is associated with sufficiently high confidence (e.g., above a predefined threshold). In some embodiments, the recognition system further determines whether the face was assigned to the null cluster. If so, the recognition system determines that no classification is available. In at least one embodiment, this determination at block 325 includes determining whether a classifier is available for the collection. That is, in such an embodiment, if no classifier is available for the collection (e.g., one has not yet been created), the method 300 may skip block 320, and determine, at block 325, that there is no classification available for the face data.

If a classification is available (e.g., the classifier model returned a label with sufficient confidence), the method 300 continues to block 330, where the recognition system returns this classification for the face data. In an embodiment, if multiple faces were detected, the recognition system can perform similar analysis (e.g., repeating blocks 320, 325, and 330) for each such face. In some embodiments, the generated label for each identified face is used to label the image from which the respective face was retrieved, such that the user can search or filter the images in the collection based on the people present in each. In one embodiment, the label may also be stored with the face data in one or more other repositories.

Returning to block 325, if no classification is available (or the classification is associated with insufficient confidence), the method 300 proceeds to block 335. At block 335, the recognition system determines whether clustering should be initiated. In embodiments, the recognition system can use any number and variety of criteria in order to determine whether to initiate clustering. For example, in some embodiments, the recognition system clusters whenever a face embedding is unable to be labeled by the classifier. In at least one embodiment, if multiple faces were detected in the received image(s), the recognition system waits until all have been processed before initiating a re-clustering. In one embodiment, the criteria includes a predefined delay from the time an un-labeled face embedding is identified (e.g., when a face image cannot be classified, the recognition system can wait a predefined period of time and initiate clustering).

In some embodiments, the criteria include a time and/or date for clustering to be performed. For example, the recognition system may refrain from clustering until off-peak times. Further, in some embodiments, the recognition system waits until a predefined number of un-classified faces are received. That is, each time the classifier model fails to label a face, the recognition system can increment a counter. This counter may be used alone or in combination with other criteria to determine whether to initiate clustering. If no clustering is to be initiated (e.g., the criteria are not satisfied), the method 300 returns to block 305. That is, the recognition system can save the face data in one or more repositories to be used in the re-clustering, whenever it occurs.

Returning to block 335, if the recognition system determines that the criteria are satisfied and clustering should be initiated, the method 300 continues to block 340. At block 340, the recognition system performs this clustering using one or more clustering techniques. In an embodiment, the clustering is performed on the entire collection (e.g., on all face embeddings associated with the collection, including the new faces), and not solely on the newly-received data. In some embodiments, this clustering includes removing, ignoring, and/or deleting the current clusters/labels for all face data/images, and completing the clustering process from scratch for the collection. In at least one embodiment, the recognition system may retain the prior clustering results, and re-cluster a subset of the data (e.g., only the newly-received faces, any faces that have been classified but not yet clustered, and the like).

Once the clustering process completes, the recognition system retrains the classifier model using the newly-generated cluster labels. In some embodiments, the recognition system does so by removing, ignoring, and/or deleting the current classifier, and training a new model from scratch. In at least one embodiment, the recognition system can refine or tune the existing classifier using the new labels. Block 340 is discussed in more detail below with reference to FIG. 4. In embodiments, once the clustering is complete, the recognition system can also associate the newly-generated cluster labels with the images/face data, such that the collection is refreshed with the new identity labels. The method 300 then returns to block 305 to continue receiving faces.

Figure 4:
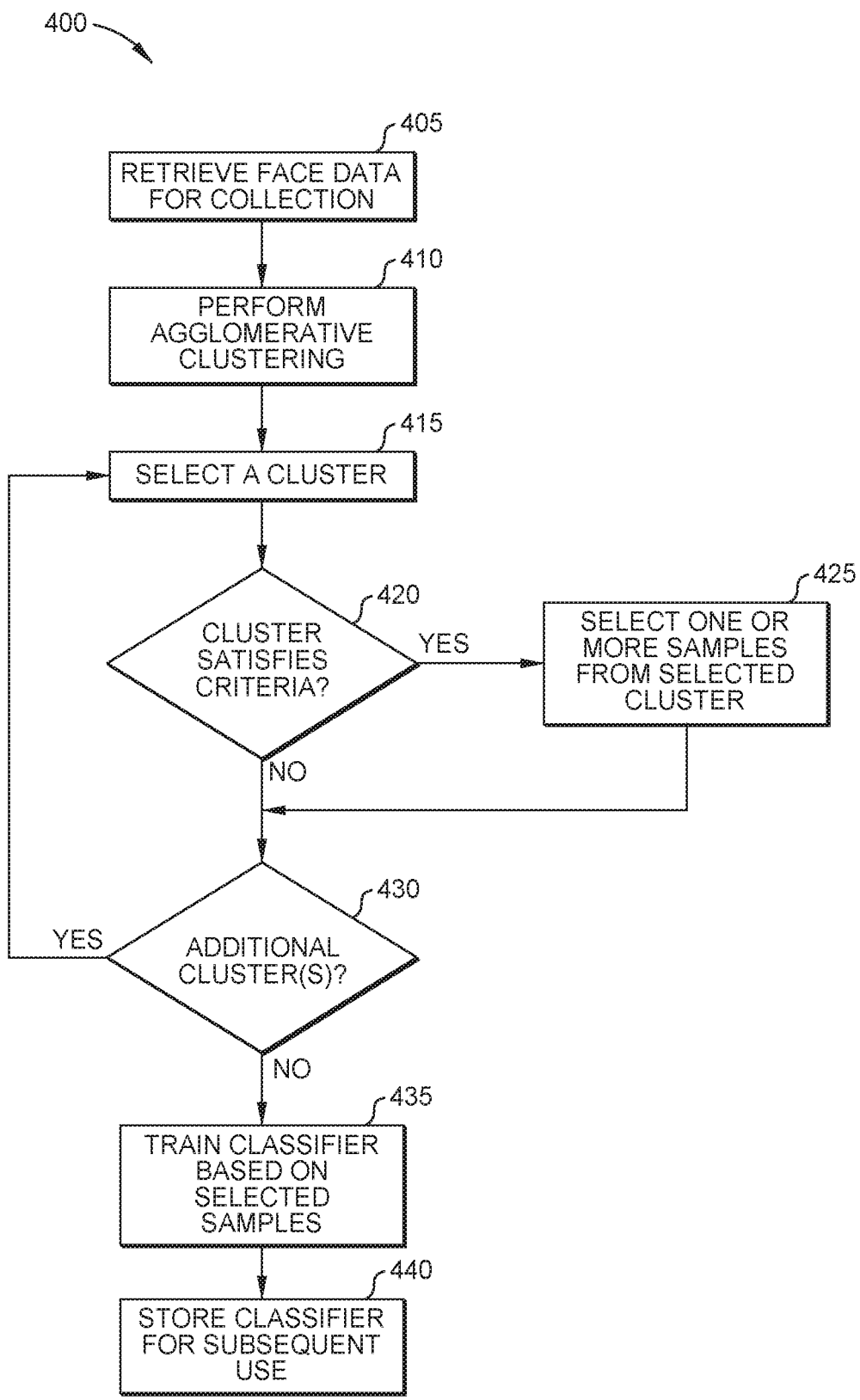
FIG. 4 is a flow diagram illustrating a method of clustering face data and training classifiers for facial recognition, according to some embodiments disclosed herein.

FIG. 4 is a flow diagram illustrating a method 400 of clustering face data and training classifiers for facial recognition, according to some embodiments disclosed herein. The method 400 begins at block 405, where the recognition system retrieves face data for the collection that is being clustered (or re-clustered). In some embodiments, this includes retrieving all face data associated with the collection. That is, the recognition system performs clustering on the entire data set, rather than solely the newly-received data. The method 400 then continues to block 410, where the recognition system performs agglomerative clustering on the collection. Although agglomerative clustering is discussed, in embodiments, any number and variety of clustering techniques may be applied to generate the clusters. In embodiments, the clustering results in a set of one or more clusters, where each cluster is associated with a unique individual reflected in the data set. In some embodiments, the recognition system also generates a null cluster for any face embeddings that were not assigned to any cluster. The method 400 then proceeds to block 415.

At block 415, the recognition system selects one of the generated clusters (other than the null cluster, if present). At block 420, the recognition system determines whether the selected cluster satisfies one or more predefined criteria. In one embodiment, this criteria includes a minimum number of samples/embeddings included in the cluster. For example, the recognition system may refrain from further processing any clusters that are below a predefined size (e.g., because it is unlikely that new images will contain this individual). In some embodiments, the criteria include a maximum number of clusters to be considered. For example, the recognition system can sort the clusters (e.g., by size) and select a predefined number of them (e.g., the k largest clusters).

In one embodiment, the criteria include an age of the cluster. This may be determined based on the oldest face in the cluster, the newest face in the cluster, and the like. For example, the recognition system may determine the selected cluster fails this criteria if the newest face embedding in the cluster exceeds a predefined age (e.g., is more than one year old). That is, because the user has not added an image of this individual to the collection in over a year, it is less likely that new images in the collection will include this individual. In various embodiments, the recognition system may utilize any number and combination of criteria in order to determine whether each cluster satisfies the criteria.

If the recognition system determines that the currently selected cluster does not satisfy the relevant criteria, the method 400 continues to block 430. If the selected cluster satisfies the criteria, the method 400 proceeds to block 425. At block 425, the recognition system selects one or more samples from the selected cluster. These selected samples will be used to train the classifier model for the collection, based on the selected cluster. In some embodiments, the recognition system selects all samples (e.g., all face data) in the cluster. In another embodiment, the recognition system selects up to a predefined maximum number of exemplars, as discussed above. This selection is random or pseudo-random in some embodiments. In at least one embodiment, the pseudo-random selection includes weighting the selection towards more recent face data, such that the classifier is trained on data that more-closely reflects the current face of the individual. In embodiments, any method may be used to select examples from the cluster in accordance with the present disclosure. Once sample(s) have been selected, the method 400 continues to block 430.

At block 430, the recognition system trains a classifier machine learning (ML) model based on the selected samples. In at least one embodiment, the classifier is an EVM model. To train the classifier, the recognition system can generally provide all or a portion of the face data of each selected sample (e.g., the face embedding) as input to the classifier, and utilize the corresponding label (e.g., cluster identifier) as the target output. By computing the loss (the difference between the target label and the generated output) and using backpropagation, the recognition system can iteratively refine the classifier for each selected sample. In some embodiments, the recognition system can similarly select and use one or more samples from the null cluster to train the classifier.

Additionally, in at least one embodiment, the recognition system can further select one or more samples to be used as negative exemplars for the selected clusters. For example, for each selected cluster (e.g., each cluster that satisfies the criteria at block 420), the recognition system can select (randomly or pseudo-randomly) one or more samples from other cluster(s) and/or from the null cluster. These negative examples are then used to train the classifier to more-accurately generate labels for the collection (by refraining from assigning input to the given cluster when it does not depict the individual associated with the given cluster).

Once the classifier is trained, the method 400 continues to block 440, where the recognition system stores the trained classifier for subsequent use. In some embodiments, this includes storing the classifier at a storage location readily accessible by the recognition system (e.g., in the cloud, or on the client device) in order to quickly and efficiently process newly-received images. In embodiments, using the classifier can significantly reduce latency and computational expense of labeling new faces.

Figure 5:
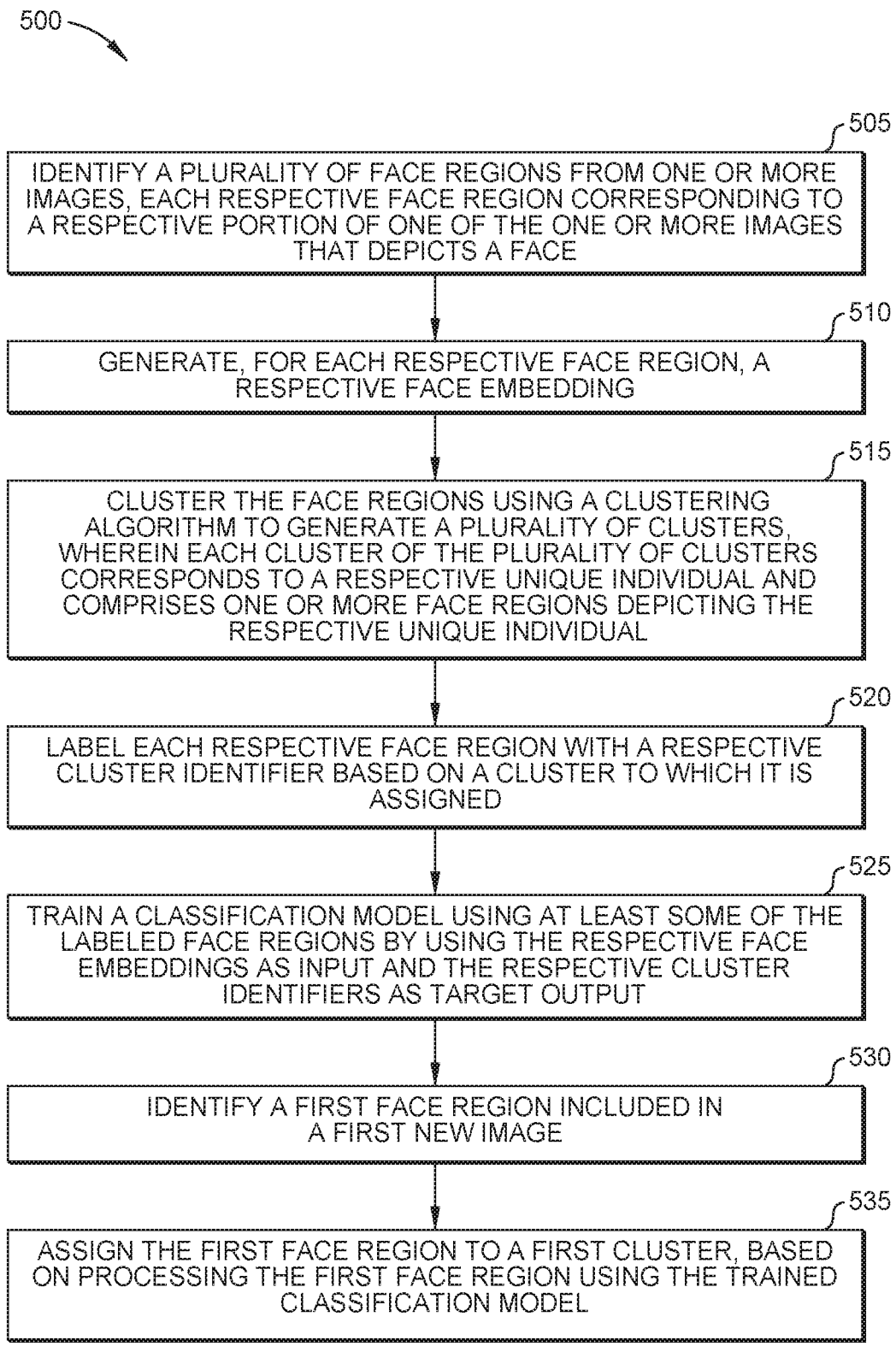
FIG. 5 is a flow diagram illustrating a method of providing facial recognition using clustering and classifier models, according to some embodiments disclosed herein.

FIG. 5 is a flow diagram illustrating a method 500 of providing facial recognition using clustering and classifier models, according to some embodiments disclosed herein. The method 500 begins at block 505, where a recognition system identifies a plurality of face regions from one or more images, each respective face region corresponding to a respective portion of one of the one or more images that depicts a face. At block 510, the recognition system generates, for each respective face region, a respective face embedding. The method 500 then continues to block 515, where the recognition system clusters the face regions using an agglomerative clustering algorithm to generate a plurality of clusters, wherein each cluster of the plurality of clusters corresponds to a respective unique individual and comprises one or more face regions depicting the respective unique individual. Further, at block 520, the recognition system labels each respective face region with a respective cluster identifier based on a cluster to which it is assigned. Additionally, at block 525, the recognition system trains a classification model using at least some of the labeled face regions by using the respective face embeddings as input and the respective cluster identifiers as target output. The method 500 then proceeds to block 530, where the recognition system identifies a first face region included in a first new image. At block 535, the recognition system assigns the first face region to a first cluster, based on processing the first face region using the trained classification model.

Figure 6:
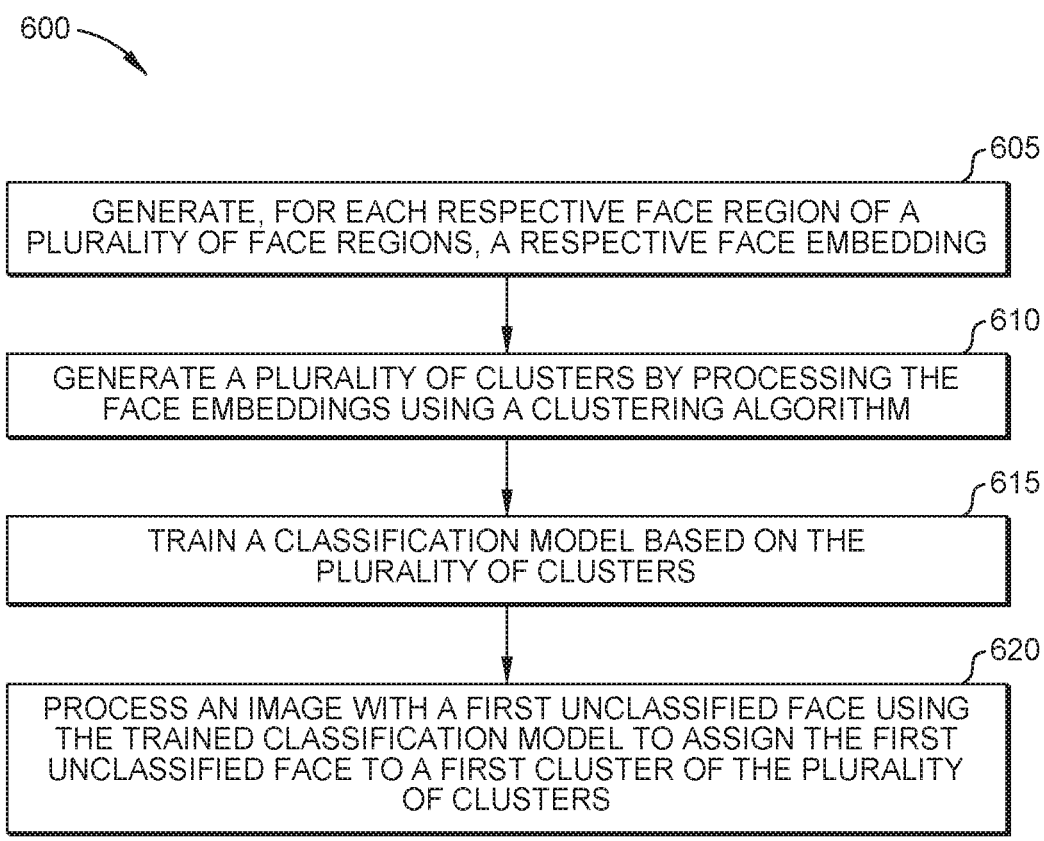
FIG. 6 is a flow diagram illustrating a method of providing facial recognition using clustering and classifier models, according to some embodiments disclosed herein.

FIG. 6 is a flow diagram illustrating a method 600 of providing facial recognition using clustering and classifier models, according to some embodiments disclosed herein. The method 600 begins at block 605, where a recognition system generates, for each respective face region of a plurality of face regions, a respective face embedding. At block 610, the recognition system generates a plurality of clusters by processing the face embeddings using a clustering algorithm. The method 600 then proceeds to block 615, where the recognition system trains a classification model based on the plurality of clusters. Further, at block 620, the recognition system processes an image with a first unclassified face using the trained classification model to assign the first unclassified face to a first cluster of the plurality of clusters.

Figure 7:
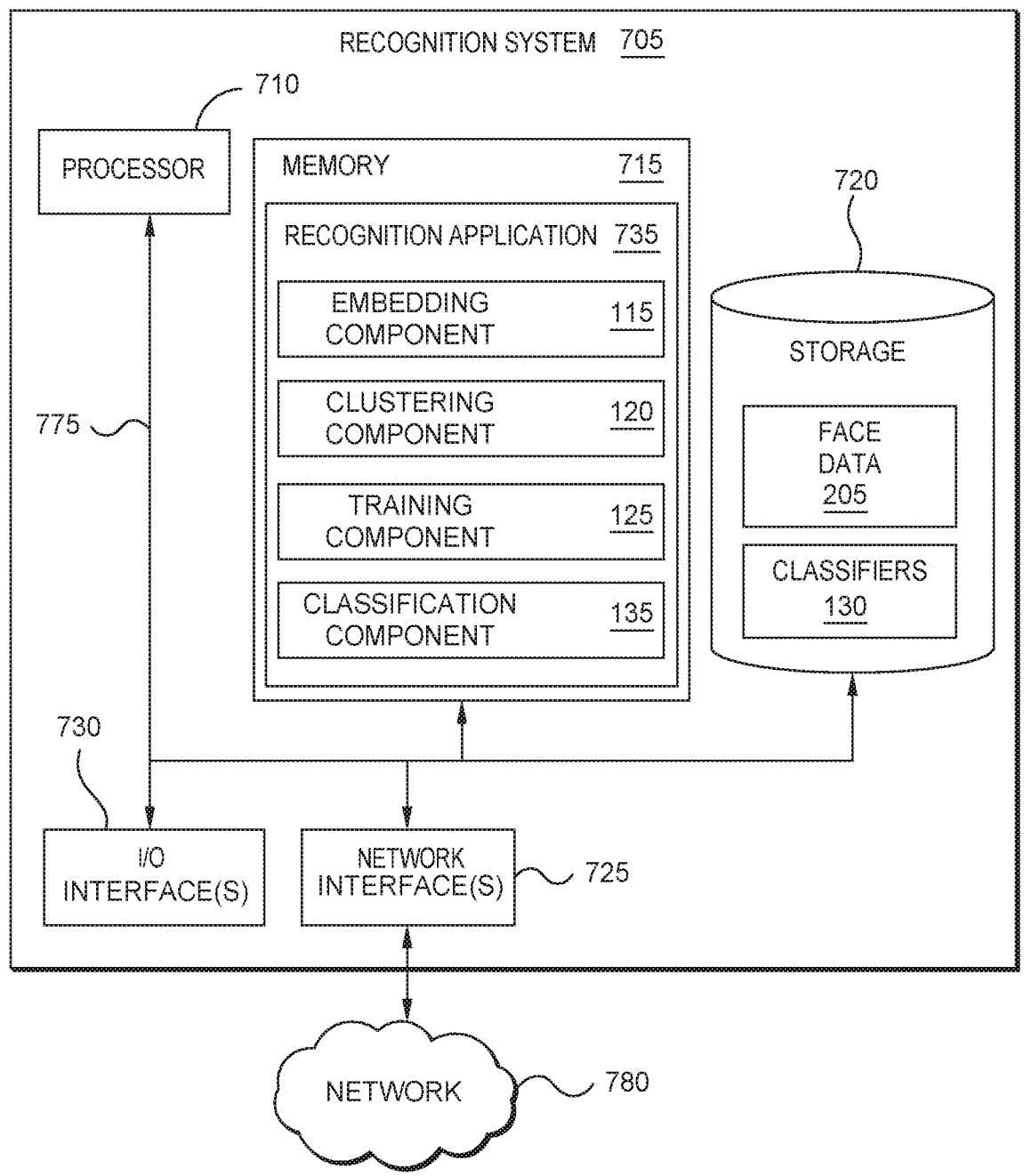
FIG. 7 is a block diagram depicting a recognition system configured to provide facial recognition using hybrid clustering techniques and classifier models, according to some embodiments disclosed herein.

FIG. 7 is a block diagram depicting a Recognition System 705 configured to provide facial recognition using hybrid clustering techniques and classifier models, according to some embodiments disclosed herein. Although depicted as a physical device, in embodiments, the Recognition System 705 may be implemented as a virtual device or service, and/or across a number of devices (e.g., in a cloud environment). As illustrated, the Recognition System 705 includes a Processor 710, Memory 715, Storage 720, a Network Interface 725, and one or more I/O Interfaces 730. In the illustrated embodiment, the Processor 710 retrieves and executes programming instructions stored in Memory 715, as well as stores and retrieves application data residing in Storage 720. The Processor 710 is generally representative of a single CPU and/or GPU, multiple CPUs and/or GPUs, a single CPU and/or GPU having multiple processing cores, and the like. The Memory 715 is generally included to be representative of a random access memory. Storage 720 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as a mouse, a keyboard, a monitor, a touchscreen, etc.) are connected via the I/O Interface(s) 7430. Further, via the Network Interface 725, the Recognition System 705 can be communicatively coupled with one or more other devices and components (e.g., directly or via the Network 780, which may include the Internet, local network(s), and the like). For example, via the Network 780, the Recognition System 705 may be communicatively coupled with client devices, image repositories, and the like. Additionally, the Network 780 may include wired connections, wireless connections, or a combination of wired and wireless connections. As illustrated, the Processor 710, Memory 715, Storage 720, Network Interface(s) 725, and I/O Interface(s) 730 are communicatively coupled by one or more Buses 775. In embodiments, the Recognition System 705 may be implemented as a standalone device, as part of a cloud deployment, as an application executing on a user's phone or computer, or as a combination of these and any other implementations.

In the illustrated embodiment, the Storage 720 includes Face Data 205 and a set of Classifiers 130. Although depicted as residing in Storage 720, the Face Data 205 and Classifiers 130 may be stored in any suitable location. In an embodiment, the Face Data 205 generally includes information about faces included in one or more collections. For example, the Face Data 205 can include a face embedding vector for each face in the collection. In one embodiment, the Face Data 205 includes data for a single collection. In another embodiment, the Face Data 205 can include data for any number of collections. That is, the Storage 720 may act as a repository storing Face Data 205 for multiple users/clients.

In embodiments, each record in the Face Data 205 corresponds to a single instance of a face included in a collection. That is, each record corresponds to a particular human face depicted in a particular image in the collection. In some embodiments, each record further includes a label or identifier indicating the cluster or group to which it belongs. For example, if the particular record has undergone a full clustering, it may include a label indicating its cluster assignment. If the record has been classified by a classifier model, it can similarly indicate the assigned label. In this way, the Face Data 205 can be used to train/refine classifier models as needed, and can further be used to readily sort, filter, and search for face data belonging to particular individuals (e.g., to retrieve images that contain that individual).

In embodiments, the Classifiers 130 are trained models, such as EVM models, configured to assign identity labels to input face embeddings. That is, the models are trained to recognize individuals, and label face images belonging to the same individual with the same label. In some embodiments, a separate Classifier 130 is maintained for each collection of images. When a new image/face is received, the Recognition System 705 can determine the collection it belongs to/the user or client it was received from, and retrieve the corresponding Classifier 130. This allows the system to quickly evaluate new images using personalized models.

In the illustrated embodiment, the Memory 715 includes a Recognition Application 735. The Recognition Application 735 is generally configured to perform one or more of the embodiments discussed herein. Although depicted as software residing in Memory 715, in embodiments, the functionality of the Recognition Application 735 may be implemented using software, hardware, or a combination of software and hardware. As illustrated, the Recognition Application 735 includes an Embedding Component 115, a Clustering Component 120, a Training Component 125, and a Classification Component 135. Although depicted as discrete components for conceptual clarity, in embodiments, the operations of the Embedding Component 115, Clustering Component 120, Training Component 125, and Classification Component 135 may be combined or distributed across any number of components and devices.

In an embodiment, the Embedding Component 115 generates face embedding vectors for faces included in images. In one embodiment, to do so, the Embedding Component 115 utilizes a portion of a deep neural network trained to recognize/classify faces. By using the output of the penultimate layer, the Embedding Component 115 can return a high-dimensional vector reflecting the features of the input face. In some embodiments, the Embedding Component 115 also uses various techniques to identify faces in images (e.g., to determine a coordinate and/or bounding box for each face). Further, in at least one embodiment, the Embedding Component 115 can pre-process each face, such as by cropping to the face, converting it to a standardized size, and the like. In embodiments, the Embedding Component 115 generates an embedding for each face depicted in each image in the collection. These face embeddings are subsequently used by downstream components to classify/cluster the face images based on the unique individual they depict.

The Clustering Component 120 is generally configured to process face embeddings in order to generate a set of clusters, each cluster representing a respective unique individual. In one embodiment, to do so, the Clustering Component 120 utilizes an agglomerative clustering technique. In some embodiments, the Clustering Component 120 can additionally generate a null or junk cluster, which includes all face embeddings that are not assigned to any other cluster. In embodiments, the Clustering Component 120 is used to perform re-clustering of the face embeddings in a given collection as needed. In various embodiments, these re-clusters are generally performed intermittently (e.g., periodically, or upon satisfaction of other predefined criteria) rather than being repeated each time a new image is added.

In embodiments, the Training Component 125 is generally configured to train classifier models based on the labels/clusters generated by the Clustering Component 120. In at least one embodiment, the model is an EVM model. In some embodiments, the Training Component 125 uses all generated clusters when training the model. In other embodiments, the Training Component 125 uses only a subset (e.g., the k largest models). In at least one embodiment, the Training Component 125 can also train for the null cluster. In embodiments, for each cluster used to train the model, the Training Component 125 selects one or more samples or exemplars included in the cluster. This may include training on all of the samples, or training on some subset therefrom. In at least one embodiment, the Training Component 125 can also use one or more negative samples for each such cluster.

When a Classifier 130 has been trained for a collection, the Classification Component 135 generally uses this trained model to evaluate newly-received face images (e.g., to process face embeddings generated for faces included in new images). By using these models, the faces can be identified and labeled with significantly reduced latency and computational expense, as compared to executing a full re-clustering for each new image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Recognition Application 735) or related data available in the cloud. For example, the Recognition Application 735 could execute on a computing system in the cloud and evaluate images to label faces. In such a case, the Recognition Application 735 could generate classifiers for each collection, and store the classifiers at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
identifying a plurality of face regions from one or more images, each respective face region corresponding to a respective portion of one of the one or more images that depicts a face;
generating, for each respective face region, a respective face embedding;
clustering the face regions using a clustering algorithm to generate a plurality of clusters, wherein each cluster of the plurality of clusters corresponds to a respective unique individual and comprises one or more face regions depicting the respective unique individual;
labeling each respective face region with a respective cluster identifier based on a cluster to which it is assigned;

training a classification model using at least some of the labeled face regions by using the respective face embeddings as input and the respective cluster identifiers as target output;
identifying a first face region included in a first new image; and
assigning the first face region to a first cluster, based on processing the first face region using the trained classification model.

2. The computer-implemented method of claim 1, the method further comprising:
receiving a second face region included in a second new image; and
upon determining that the second face region cannot be assigned, by the trained classification model, to any cluster with sufficient confidence:
re-clustering the plurality of face regions and the second face region using the clustering algorithm;
training a new classification model based on the re-clustered face regions; and
using the new classification model to process newly-received images.

3. The computer-implemented method of claim 1, the method further comprising:
determining, for each respective cluster of the plurality of clusters, a number of face regions included within the respective cluster;
refraining from training the classification model based on at least one cluster of the plurality of clusters, based on the number of face regions included in the at least one cluster.

4. The computer-implemented method of claim 1, the method further comprising:
generating a null cluster comprising face regions that were not assigned to any of the plurality of clusters by the clustering algorithm; and
training the classification model based on the null cluster.

5. A non-transitory computer readable medium comprising computer readable code executable by one or more processors to perform an operation comprising:
generating, for each respective face region of a plurality of face regions, a respective face embedding;
generating a plurality of clusters by processing the face embeddings using a clustering algorithm;
training a classification model based on the plurality of clusters; and
processing an image with a first unclassified face to assign the first unclassified face to a first cluster of the plurality of clusters, comprising:
generating a first unclassified face embedding for the first unclassified face; and
processing the first unclassified face embedding using the trained classification model.

6. The non-transitory computer readable medium of claim 5, the operation further comprising:
processing an image with a second unclassified face using the trained classification model; and
upon determining that the second unclassified face cannot be assigned, by the trained classification model, to any cluster with sufficient confidence:
re-clustering the plurality of face regions and the first and second unclassified faces using the clustering algorithm;
training a new classification model based on the re-clustered face regions; and
using the new classification model to process newly-received images.

7. The non-transitory computer readable medium of claim 5, the operation further comprising:
determining a respective size of each respective cluster of the plurality of clusters;
selecting a subset of the plurality of clusters based on the respective sizes; and
training the classification model based only on the selected subset of the plurality of clusters, wherein the classification model is not trained based on at least one of the plurality of clusters.

8. The non-transitory computer readable medium of claim 5, the operation further comprising:
generating a null cluster comprising face regions that were not assigned to any of the plurality of clusters by the clustering algorithm; and
training the classification model based on the null cluster.

9. The non-transitory computer readable medium of claim 5, wherein the classification model is an extreme value machine (EVM), and wherein the EVM calculates distances between face embeddings using a Bray-Curtis dissimilarity metric.

10. The non-transitory computer readable medium of claim 5, wherein training the classification model comprises:
selecting a predefined number of face regions from a first cluster of the plurality of clusters to be used as positive examples, wherein at least one face region in the first cluster is excluded from the selection; and
training the classification model using the selected face regions as positive examples, wherein the at least one face region is not used to train the classification model.

11. The non-transitory computer readable medium of claim 5, wherein training the classification model comprises:
selecting a predefined number of face regions from the plurality of clusters to be used as negative examples for a first cluster, wherein the selected face regions do not include any face regions in the first cluster; and
training the classification model using the selected face regions as negative examples for the first cluster.

12. The non-transitory computer readable medium of claim 5, wherein the trained classification model is user-specific, such that each respective user of a plurality of users is associated with a respective classification model.

13. A computer-implemented method, comprising:
generating, for each respective face region of a plurality of face regions, a respective face embedding;
generating a plurality of clusters by processing the face embeddings using a clustering algorithm;
training a classification model based on the plurality of clusters; and
processing an image with a first unclassified face to assign the first unclassified face to a first cluster of the plurality of clusters, comprising:
generating a first unclassified face embedding for the first unclassified face; and
processing the first unclassified face embedding using the trained classification model.

14. The computer-implemented method of claim 13, further comprising:
processing an image with a second unclassified face using the trained classification model; and
upon determining that the second unclassified face cannot be assigned, by the trained classification model, to any cluster with sufficient confidence:
re-clustering the plurality of face regions and the first and second unclassified faces using the clustering algorithm;

training a new classification model based on the re-clustered face regions; and using the new classification model to process newly-received images.

15. The computer-implemented method of claim 13, further comprising:

determining a respective size of each respective cluster of the plurality of clusters;

selecting a subset of the plurality of clusters based on the respective sizes; and training the classification model based only on the selected subset of the plurality of clusters, wherein the classification model is not trained based on at least one of the plurality of clusters.

16. The computer-implemented method of claim 13, further comprising:

generating a null cluster comprising face regions that were not assigned to any of the plurality of clusters by the clustering algorithm; and training the classification model based on the null cluster.

17. The computer-implemented method of claim 13, wherein the classification model is an extreme value machine (EVM), and wherein the EVM calculates distances between face embeddings using a Bray-Curtis dissimilarity metric.

18. The computer-implemented method of claim 13, wherein training the classification model comprises:

selecting a predefined number of face regions from a first cluster of the plurality of clusters to be used as positive examples, wherein at least one face region in the first cluster is excluded from the selection; and training the classification model using the selected face regions as positive examples, wherein the at least one face region is not used to train the classification model.

19. The computer-implemented method of claim 13, wherein training the classification model comprises:

selecting a predefined number of face regions from the plurality of clusters to be used as negative examples for a first cluster, wherein the selected face regions do not include any face regions in the first cluster; and training the classification model using the selected face regions as negative examples for the first cluster.

20. The computer-implemented method of claim 13, wherein the trained classification model is user-specific, such that each respective user of a plurality of users is associated with a respective classification model.

* * * * *